US012354782B2

(12) United States Patent
Gradinger et al.

(10) Patent No.: US 12,354,782 B2
(45) Date of Patent: Jul. 8, 2025

(54) TRANSFORMER AND METHOD OF MANUFACTURING A TRANSFORMER

(71) Applicant: HITACHI ENERGY LTD, Zürich (CH)

(72) Inventors: Thomas Gradinger, Aarau Rohr (CH); Uwe Drofenik, Zürich (CH)

(73) Assignee: HITACHI ENERGY LTD, Zürich (CH)

( * ) Notice: Subject to any disclaimer, the term of this patent is extended or adjusted under 35 U.S.C. 154(b) by 1007 days.

(21) Appl. No.: 17/289,927

(22) PCT Filed: Oct. 30, 2019

(86) PCT No.: PCT/EP2019/079719

§ 371 (c)(1),
(2) Date: Apr. 29, 2021

(87) PCT Pub. No.: WO2020/089329

PCT Pub. Date: May 7, 2020

(65) Prior Publication Data

US 2022/0005643 A1 Jan. 6, 2022

(30) Foreign Application Priority Data

Oct. 31, 2018 (EP) .................................... 18203720

(51) Int. Cl.
*H01F 27/28* (2006.01)
*H01F 27/34* (2006.01)
*H01F 41/066* (2016.01)

(52) U.S. Cl.
CPC ......... *H01F 27/2823* (2013.01); *H01F 27/34* (2013.01); *H01F 41/066* (2016.01)

(58) Field of Classification Search
CPC ............................. H01F 27/2823; H01F 27/34
(Continued)

(56) References Cited

U.S. PATENT DOCUMENTS 2,318,068 A * 5/1943 Elsner ................... H01F 27/343 336/184
3,983,522 A * 9/1976 Gearhart ............... H01F 27/345 336/70
(Continued)

FOREIGN PATENT DOCUMENTS

CN 1672226 A 9/2005
CN 101136281 A 3/2008
(Continued)

OTHER PUBLICATIONS

First Office Action for Chinese Patent Application No. 201980066191.2, mailed May 25, 2022, 6 pages.
(Continued)

*Primary Examiner* — Shawki S Ismail
*Assistant Examiner* — Joselito S. Baisa
(74) *Attorney, Agent, or Firm* — Sage Patent Group

(57) ABSTRACT

A transformer includes a first winding arranged around an axis, and a second winding arranged around the axis. The second winding includes a litz wire having an end portion located at an axial end position of the second winding and a middle portion located at an axial middle position of the second winding. The litz wire has a first cross section at the end portion and a second cross section at the middle portion, the cross sections each including in a quadrant between the axial outward direction and the direction pointing towards the first winding a curvature extending between the axial outward direction and the direction pointing towards the first winding. The curvature of the first cross section is smaller than the curvature of the second cross section thereby reducing the peak magnitude of the electrical field between the end portion of the second winding and the first winding.

12 Claims, 3 Drawing Sheets

(58) Field of Classification Search
USPC .......................................................... 336/182
See application file for complete search history.

(56) References Cited

U.S. PATENT DOCUMENTS

| | | | | | |
|---|---|---|---|---|---|
| 4,042,900 | A * | 8/1977 | Hinton | H01F 27/345 336/84 R | |
| 4,317,096 | A * | 2/1982 | Degeneff | H01F 27/363 336/70 | |
| 5,315,982 | A * | 5/1994 | Ward | F02P 3/02 123/634 | |
| 2010/0007452 | A1* | 1/2010 | Forsberg | H01F 27/36 29/606 | |
| 2013/0113598 | A1* | 5/2013 | Murillo | H01F 41/06 29/605 | |
| 2017/0169938 | A1* | 6/2017 | Kainaga | H01F 27/28 | |
| 2018/0025833 | A1 | 1/2018 | Kainaga et al. | | |
| 2018/0233271 | A1* | 8/2018 | Tarasinski | H01F 27/125 | |
| 2020/0219646 | A1* | 7/2020 | Ichimura | H01F 27/36 | |
| 2020/0295665 | A1 | 9/2020 | Jimichi et al. | | |

FOREIGN PATENT DOCUMENTS

| | | | | |
|---|---|---|---|---|
| CN | 201134328 | Y | 10/2008 | |
| CN | 103069515 | A | 4/2013 | |
| CN | 106797139 | A | 5/2017 | |
| CN | 117498048 | A * | 2/2024 | H01R 11/12 |
| DE | 102016221534 | A1 | 5/2018 | |
| EP | 4191620 | A1 * | 6/2023 | H01F 27/24 |
| JP | 5029219 | U | 7/1948 | |
| JP | 6138916 | U | 3/1986 | |
| JP | S61218123 | A | 9/1986 | |
| JP | 2000164435 | A | 6/2000 | |
| JP | 2004119811 | A * | 4/2004 | |
| JP | 2017108102 | A | 6/2017 | |
| SK | 500262015 | U1 * | 4/2010 | |
| WO | 2018007514 | A1 | 1/2018 | |
| WO | 2019087466 | A1 | 5/2019 | |

OTHER PUBLICATIONS

Notice of Reasons for Refusal for Japanese Patent Application No. 2021-523424, mailed Jul. 29, 2022, 5 pages.
International Search Report and Written Opinion for International Application No. PCT/EP2019/079719 dated Dec. 13, 2019, 13 pages.

* cited by examiner

TRANSFORMER AND METHOD OF MANUFACTURING A TRANSFORMER

CROSS REFERENCE TO RELATED APPLICATIONS

This application is a 35 U.S.C. § 371 national stage application of PCT International Application No. PCT/EP2019/079719 filed on Oct. 30, 2019, which in turns claims foreign priority to EP Patent Application No. 18203720.0, filed on Oct. 31, 2018, the disclosures and content of which are incorporated by reference herein in their entirety.

TECHNICAL FIELD

Embodiments of the present disclosure relate to transformers, particularly medium-frequency transformers (MFTs). Further embodiments of the present disclosure relate to methods of manufacturing a transformer.

BACKGROUND

Medium-frequency transformers (MFTs) are key components in various power-electronic systems. Examples in rail vehicles are auxiliary converters and solid-state transformers (SSTs) replacing the bulky low-frequency traction transformers. Further applications of SSTs are being considered, for example for grid integration of renewable energy sources, EV charging infrastructure, data centers, or power grids on board of ships. It is expected that SSTs will play an increasingly important role in the future.

The electric insulation constitutes a significant challenge in MFTs, because, on the one hand, operating voltages can be high (in the range of 10 kV to 50 kV) and on the other hand, the power of an individual MFT is rather low (in the range of several hundred kVA) compared to conventional low-frequency distribution and power transformers. Therefore, the space occupied by the electrical insulation is relatively large compared to the total size of the MFT. In particular, the filling ratio of the core window, i.e. the fraction of core-window area filled with winding conductors, is relatively poor. Smart solutions are needed to minimize insulation distances and optimize the filling ratio. To optimize the filling ratio, high- and low-voltage winding may be cast together resulting in smaller insulation distances than with air. Still, careful field grading is still necessary to avoid field peaks that create partial discharge and shorten the insulation's lifetime.

Because of the elevated frequencies, for example 10 kHz at which MFTs operate, the windings are often made from litz wires. This is necessary to keep skin- and proximity-effect losses within acceptable limits.

Accordingly, there is a continuing demand for transformers, which are improved compared to the state of the art, particularly with respect to providing an optimal field grading.

SUMMARY

In light of the above, a transformer and method of manufacturing a transformer according to the independent claims are provided. Further aspects, advantages, and features are apparent from the dependent claims, the description, and the accompanying drawings.

According to an aspect of the present disclosure, a transformer is provided, the transformer comprises: a first winding arranged around an axis defining an axial direction, and a second winding arranged around the axis, wherein the second winding comprises a litz wire having an end portion located at an axial end position of the second winding and a middle portion located at an axial middle position of the second winding, the litz wire having a first cross section at the end portion and a second cross section at the middle portion, the first and second cross sections each comprising in a quadrant between the axial outward direction and the direction pointing towards the first winding a curvature extending between the axial outward direction and the direction pointing towards the first winding, wherein the curvature of the first cross section is smaller than the curvature of the second cross section.

According to an aspect, the transformer as described herein has a reduced peak magnitude of the electrical field between the end portion of the second winding and the first winding compared to transformer in which the curvature of the first cross section is essentially equal to the curvature of the second cross section.

Accordingly, the design of the transformer of the present disclosure is improved compared to conventional transformers. In particular the transformer as described herein provides an optimal field grading and a reduction of the peak magnitude of the electrical field at the end portion of the windings allowing compact and economic transformer design. The reduction of the peak magnitude of the electrical field is compared to a transformer, in which the cross sections of the middle and end portions are equal.

The transformer comprises a first winding and a second winding arranged around the same axis. The first and/or second winding can be arranged in a spiral or helix structure along the axis. Typically, the first winding is an inner winding and the second winding is an outer winding.

The second winding comprises a litz wire with a plurality of litz wire strands. This significantly reduces loses due to the skin- and proximity-effect. The litz wire strands can be separated by an insulation layer encapsulating each litz wire strand. The first winding can also comprise a litz wire.

The second winding comprises a litz wire having an end portion located at an axial end position of the second winding and a middle portion located at an axial middle position of the second winding. The second winding can also comprise, for example, two radial rows of the litz wire. The end portion of the litz wire does not include that the litz wire itself has to end at the end portion of the second winding. The litz wire can extend to, for example, external contacts or can continue in the second winding for another radial row. The end portion is located at an axial end position of the second winding so that the second winding terminates in further axial direction.

According to an aspect of the present disclosure, a direction from the axial middle position pointing towards the axial end position defining an axial outward direction, a direction from the second winding pointing towards the first winding defining a direction pointing towards the first winding.

According to a further aspect of the present disclosure, a method of manufacturing a transformer is provided. The method includes: arranging a first winding in the direction of an axis; providing a continuous litz wire comprising a middle portion and an end portion; forming a second winding from the continuous litz wire around the axis, wherein the end portion is located at an axial end position of the second winding and the middle portion is located at an axial middle position of the second winding, the litz wire having a first cross section at the end portion and a second cross section at the middle portion, the first and second cross sections each comprising in the quadrant between the axial outward direction and the direction pointing towards the first winding a curvature extending between the axial outward direction and the direction pointing towards the first winding, wherein the curvature of the first cross section is smaller than the curvature of the second cross section.

According to an aspect, the transformer manufactured as described herein is configured to have a reduced peak magnitude electrical field gradient between the end portion of the second winding and the first winding.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
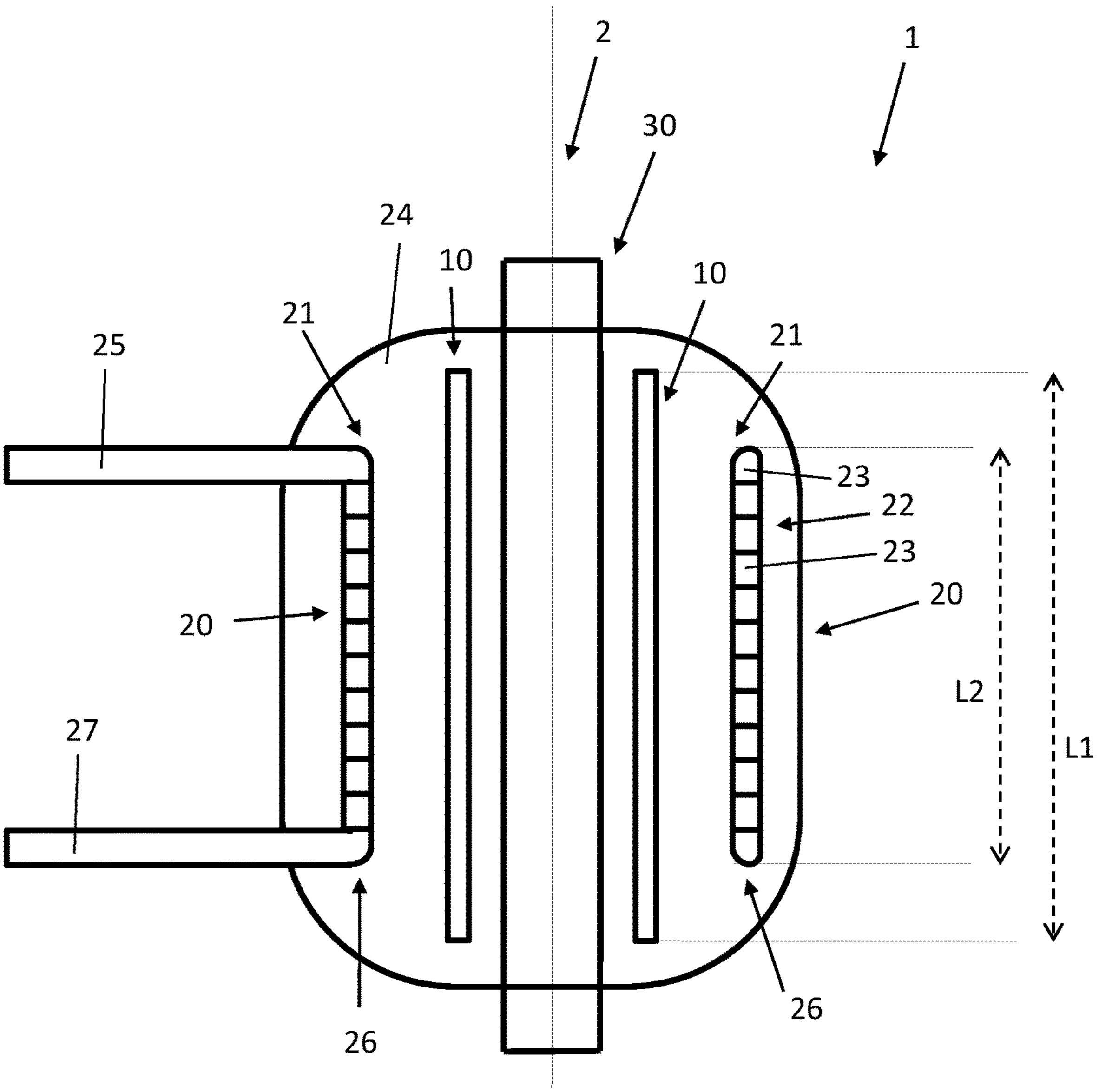
FIG. 1 shows a schematic cross section view of a transformer according to embodiments described herein.

With exemplary reference to FIG. 1, a transformer 1 according to the present disclosure is described. According to embodiments, which can be combined with other embodiments described herein, the transformer 1 includes a first winding 10 arranged around an axis 2 defining an axial direction, and a second winding 20 arranged around the axis 2, wherein the second winding 20 comprises a litz wire 23 having an end portion 21 located at an axial end position of the second winding 20 and a middle portion 22 located at an axial middle position of the second winding 20, the litz wire 23 having a first cross section at the end portion 21 and a second cross section at the middle portion 22, the first and second cross sections each comprising in the quadrant 40 between the axial outward direction and the direction pointing towards the first winding 10 a curvature extending between the axial outward direction and the direction pointing towards the first winding 10. The curvature can extend at least partially or especially completely a 90° angular sector. The curvature of the first cross section is smaller than the curvature of the second cross section thereby reducing the peak magnitude of the electrical field between the end portion 21 of the second winding 20 and the first winding 10. The cross sections of the middle and end portion 21, 22 of the litz wire 23 are shown in more detail FIGS. 2 to 5.

The axis 2 defines an axial direction. The axial outward direction is a direction pointing from the middle portion 22 to the end portion 21 of the second winding 20. It can be upward or downward in the FIG. 1. The cross section can be described as is a plane orthogonal to the litz wire 23 or a plane containing the axis 2 of the transformer 1 as shown in FIG. 1.

A direction from the axial middle position pointing towards the axial end position defining an axial outward direction, a direction from the second winding (20) pointing towards the first winding (10) defining a direction pointing towards the first winding (10).

A direction from the first winding (10) pointing towards the second winding (20) defines a direction pointing away from the first winding (10).

The curvature in the quadrant between the axial outward direction and the direction pointing towards the first winding 10 should be understood as a geometric curvature of the litz wire or group of litz wires. The curvature does not need to be constant. The curvature can be defined as the curvature in the quadrant that significantly defines the electric field gradient between the first and second winding 10, 20. Typically the peak curvature of the first cross section is smaller than the peak curvature of the second cross section thereby reducing the peak magnitude of the electrical field between the end portion 21 of the second winding 20 and the first winding 10.

The curvature in the quadrant is smaller in the end portion 21 than in the middle portion 22. In other word, the radius of curvature in the described quadrant in the end portion 21 is larger than in the middle portion 23. If, for example, the middle portion has a sharp edge, the curvature would be maximum at the edge. The smaller the local radius of curvature, the bigger the curvature. A sharp edge has an infinite small radius of curvature and has, therefore, a maximum curvature. The smaller curvature in this example can be a quarter of a circle (partly oval or partly radial) which has a smaller curvature than the sharp edge.

Middle and end portion 21, 22 are not sharply separated. There can be a continuously transition between the middle portion 22 and the end portion 21. No joints such as soldering or brazing joints from the middle portion 22 to the end portion 21 are necessary. According to an embodiment, the end portion 21 of the second winding 20 includes a turn of at least 300°, particularly at least 360°, around the axis 2. This ensures a reduction of the peak magnitude of the electrical field between the end portion 21 of the second winding 20 and the first winding 10 over a defined length, which is preferably a whole and also the last turn of the second winding 20 around the axis.

According to an embodiment, the first winding 10 extends along a first length L1 in axial direction and the second winding 20 extending along a second length L2 in axial direction, wherein the second length L2 is shorter than the first length L1. For example, because of insulation, the second winding 20 is kept at a larger radial distance from axis 2 than the distance between first winding 10 and the longitudinal axis 2. The insulation distances are schematically shown in FIG. 1. This reduces the height of the second winding compared to that of the first winding 10.

According to an embodiment, the transformer further comprises a casting 24 embedding the first winding 10 and the second winding 20 for insulation.

According to an aspect, the litz wire 23 of the second winding 20 has an essentially rectangular shape in the middle portion 22. Rectangular or Square-type litz wires are typically available for comparable transformers. The second cross section can have an essentially rectangular shape and the first cross section can have a partly oval and party essentially rectangular shape, wherein the oval part is at least located in the quadrant between the axial outward direction and the direction pointing towards the first winding 10. This is also illustrated in FIGS. 2 to 5.

In all FIGS. 2 to 5, the cross section of the litz wire 23 in the middle portion 22 is essentially rectangular. In the figures, the end portion 21 is illustrated on the top. However, according to the present disclosure, the end portion can be located on the top or bottom or there can be two end portions. The litz wire has no reference sign to keep the figure simple. Preferably, the shape of the litz wire 23 in the middle portion 22 is essentially rectangular to provide a close stacking of the litz wire 23.

According to an embodiment. the end portion 21 is a first end portion 21 and the litz wire 23 comprises a second end portion 26 located at an opposite axial end position of the second winding 20, the middle portion 22 being located between the first and second end portions 21,26. The litz wire 23 has a third cross section at the second end portion 26, wherein the third and second cross sections each comprising in a quadrant between the axial outward direction and the direction pointing towards the first winding 10 a curvature extending between the axial outward direction and the direction pointing towards the first winding 10, wherein the curvature of the first cross section is smaller than the curvature of the second cross section thereby reducing the electrical field gradient between the second end portion 26 of the second winding 20 and the first winding 10.

Typically, the second winding 20 is a high voltage (HV) winding and the first winding 10 is a low voltage (LV) winding. Furthermore, the high voltage winding is typically an outer winding. According to an aspect, the transformer is adapted for a voltage in the HV winding between 10 and 50 kV and in the LV winding between 0.7 and 2 kV. Thus, the transformer can a medium frequency transformer, particularly a dry-cast middle frequency transformer.

According to an embodiment, the transformer further comprises a ferromagnetic core 30, and the first winding 10 is arranged around the ferromagnetic core 30.

According to an embodiment, the first winding 10 is adapted to be grounded during an operational state of the transformer.

The second winding 20 comprises a litz wire 23 having an end portion 21 located at an axial end position of the second winding 20 and a middle portion 22 located at an axial middle position of the second winding 20. According to an aspect, the litz wire 23 is a continuous conductor comprising the middle portion 22 and the end portion 21, wherein the curvature of the first cross section in the end portion 21 in the quadrant between the axial outward direction and the direction pointing towards the first winding 10 is obtained by press-forming the litz wire 23.

The cross sectional area of the first and second cross sections can be essentially equal, so that only the shape differs.

The second winding can further comprise an external connecting portion 25 externally connecting the second winding 20, wherein the end portion 21 is located between the connecting portion 25 and the middle portion 22 and the litz wire 23 is continuously spanning the external connecting portion 25, the end portion 21 and the middle portion 22. Accordingly, a second end portion 26 can be connected with a second external connecting portion 27 and the litz wire 23 is continuously spanning the first external connecting portion 25, the first end portion 21 the middle portion 22, the second end portion 26 and the second external connecting portion 27.

Figure 2:
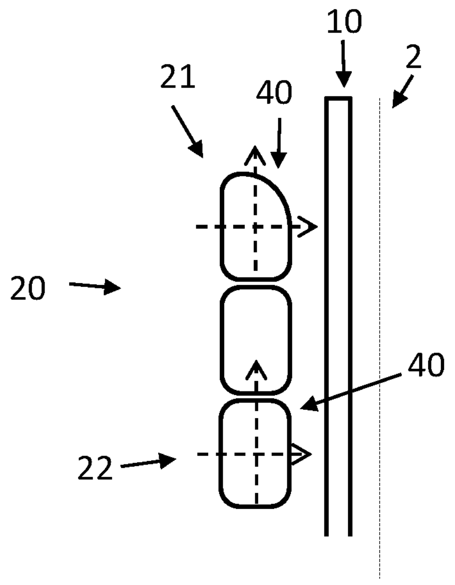
FIGS. 2 to 5 show a schematic sectional views of different cross sections of the end and middle portion of the second winding according to embodiments described herein.

FIG. 2 illustrates an extract of the transformer according to an embodiment. The litz wire 23 has an end portion 21 located at the top of the figure and a middle portion 22. The rest of the middle portion 22 and a bottom end of the litz wire 23 is not illustrated to keep the figure simple. The axis 2 defines an axial direction. A radial direction is perpendicular to the axial direction. The axial outward direction is pointing to the top of FIGS. 2 to 5. As shown, the cross section of the litz wire 23 in the end portion 21 has a smaller curvature in the quadrant 40 between the axial outward direction and the direction pointing towards the first winding 10 than the corresponding curvature in the middle portion 22. In other words, the shape of the litz wire 23 in the end portion 21 is more round between the axial outward direction and the direction pointing towards the first winding 10 or the corner radius is increased at the end portion 21 compared to the middle portion 22. This reduces the electrical field gradient in an area near the end portion 21. The quadrant 40 is shown in all FIGS. 2 to 5 in the end portion 21 and in the middle portion 22 of the second winding 20. As shown in the Figs, the quadrant 40 is the first quadrant of a Cartesian coordinate system with the origin in the middle of the litz wire 23 or in the middle of a plurality of litz wires rows 23.

In particular, it is not necessary to cut the litz wire 23 where the field grading begins in the end portion 21 and connecting litz wires 23 of originally different cross section in the middle portion 22 with cable shoes. Such a connection would significantly add to cost, manufacturing effort, space requirements, and losses. The transition between end portion 21 and middle portion can be single-piece only by a change of the cross section of the litz wire 23.

Figure 3:
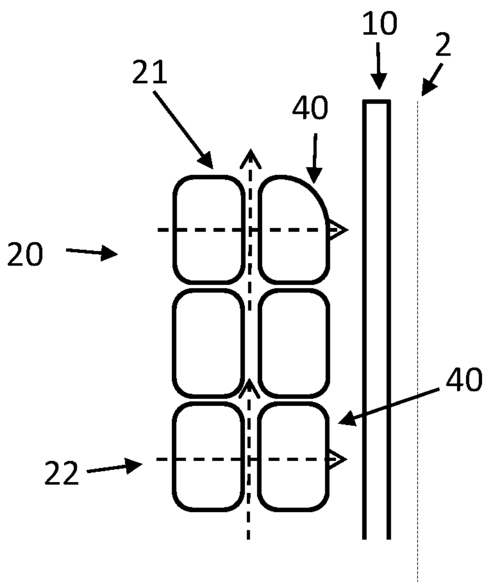
Figure 5:
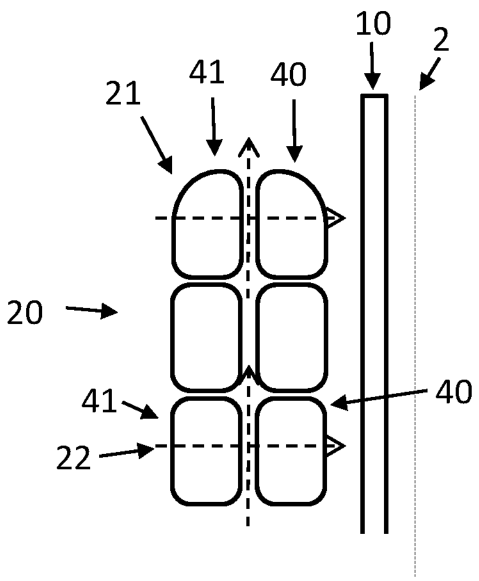

FIG. 3 shows an embodiment similar to FIG. 2 wherein the second winding 20 comprises a second turn of the litz wire 23 around the axis 2. The second winding 20 comprises two radial rows of the litz wire 23. The rows can be arranged as a double spiral. Still, the cross section of the litz wire 23 in the end portion 21 has a smaller curvature at the quadrant 40 between the axial outward direction and the direction pointing towards the first winding 10 than the corresponding curvature in the middle portion 23. If, for example, the litz wires are arranged as a double spiral, the origin of a Cartesian coordinate system can be located between the two litz wires 23 and the quadrant 40 is the first quadrant of this coordinate system as shown in FIGS. 3 and 5. There are two Cartesian coordinate system with the quadrant 40, one in the end portion 21 and one in the middle portion 22.

Figure 4:
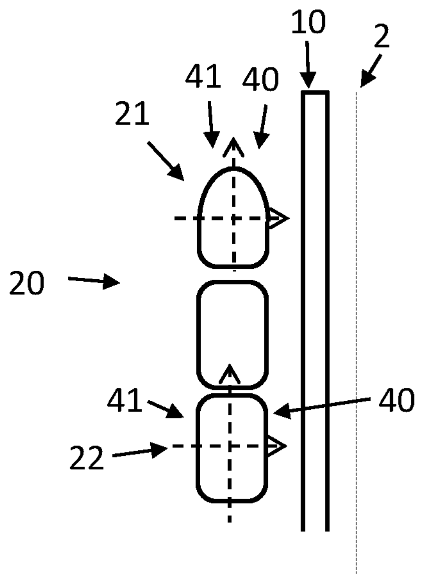

According to the embodiment of FIG. 4, the first and second cross sections each comprise in a second quadrant 41 between the axial outward direction and the direction pointing away from the first winding 10 a second curvature, wherein the second curvature of the first cross section is smaller than the curvature of the second cross section. This additionally reduces the peak magnitude of the electrical field around the end portion 21 of the litz wire 23. Analogously to the first curvature, the second curvature can span at least partially or especially completely 90° angular sector of the second quadrant 41. In Cartesian coordinate system with the origin in the middle of the litz wire 23 or litz wires 23, respectively, the quadrants 40 and 41 would be the first and second quadrants of the Cartesian coordinate system.

FIG. 5 shows another embodiment which is a combination of FIGS. 3 and 4. The second winding 20 comprises two radial rows of the litz wire 23. The outer corner of the radial outer row and the inner corner of the inner radial row are shaped as described above. The curvature spans a 90° angular sector in the quadrant, especially, the first and second curvature each span a 90° angular sector in the first and second quadrant 40, 41, respectively.

Figure 6:
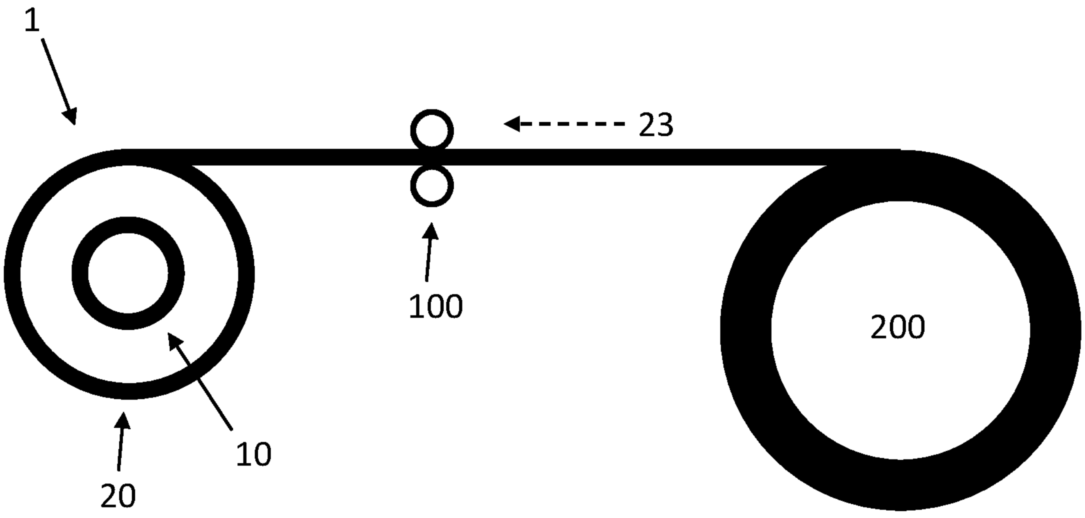
FIGS. 6 and 7 show a process steps of forming the litz wire according to embodiments of a method of manufacturing a transformer according to the present disclosure.
Figure 7:
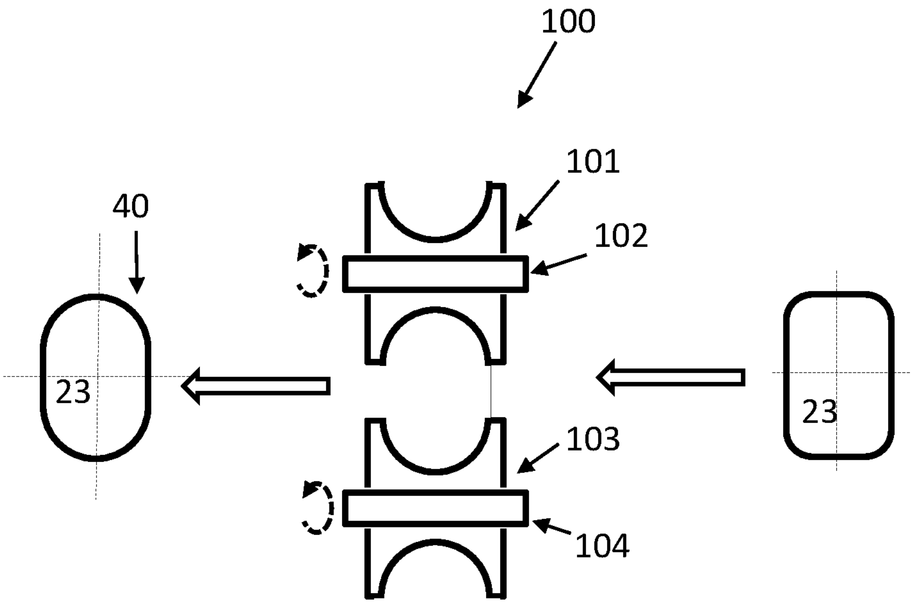

FIGS. 6 and 7 illustrate a process of forming a litz wire 23 which can be part of a method of manufacturing a transformer as suggested herein. The method can be combined which each of the embodiments of the transformer described above. The method comprises: arranging a first winding 10 in the direction of an axis 2; providing a continuous litz wire 23 comprising a middle portion 22 and an end portion 21; forming a second winding 20 from the continuous litz wire 23 around the axis 2, wherein the end portion 21 is located at an axial end position of the second winding 20 and the middle portion 22 is located at an axial middle position of the second winding 20, the litz wire 23 having a first cross section at the end portion 21 and a second cross section at the middle portion 22, the first and second cross sections each comprising in a quadrant 40 between the axial outward direction and the direction pointing towards the first winding 10 a curvature extending between the axial outward direction and the direction pointing towards the first winding 10, wherein the curvature of the first cross section is smaller than the curvature of the second cross section thereby reducing the peak magnitude of the electrical field gradient between the end portion 21 of the second winding 20 and the first winding 10.

FIG. 6 illustrates an embodiment of the suggested method in which the litz wire 23 is provided with an essentially constant cross section over the length of the second winding 20. The litz wire 23 can be provided from a reel 200 which is a typical form. The continuous litz wire 23 from the reel is lead through a pressing or squeezing device 100. The pressing or squeezing device 100 comprises a wheel or roll 101 which turns around an axis 102. The wheel or roll 101 is pressed on the litz wire 23 to reshape the litz wire 23 in the over a specific length of the litz wire 23 corresponding to the first end portion 21, resulting in a curvature of the first cross section as explained above.

According to an embodiment, the continuous litz wire 23 is provided with an essentially constant cross section over the length of the second winding 20 and wherein the forming of the second winding 20 includes: squeezing the litz wire between a first and a second wheel or roll 101, 103 over specific length of the litz wire 23 corresponding to the first end portion 21.

According to the embodiment shown in FIG. 7, the pressing or squeezing device 100 comprises two wheels or rolls 101, 103 which turn around their axis 102, 104. The litz wire in squeezed between the wheels 101, 104 and reshaped.

According to an embodiment, the cross sectional area of the first and second cross sections is essentially equal. Especially when using a pressing or squeezing device 100 shown in FIGS. 6 and 7, the cross sectional area remains essentially constant and is just reshaped.

REFERENCE NUMBERS

- 1 transformer
- 2 axis of the windings
- 10 first winding
- 20 second winding
- 21 end portion of litz wire
- 22 middle portion of litz wire
- 23 litz wire
- 24 casting
- 25 external connecting portion
- 26 second end portion of the litz wire
- 27 second external connecting portion
- 30 ferromagnetic core
- 40 quadrant between the axial outward direction and the direction pointing towards the first winding
- 41 quadrant between the axial outward direction and the direction pointing away from the first winding
- L1 first length of first winding
- L2 second length of second winding
- 100 pressing or squeezing device
- 101 wheel or roll
- 102 axis of first wheel or roll
- 103 second wheel or roll
- 104 axis of second wheel or roll

The invention claimed is:

1. A transformer comprising:

a first winding arranged around an axis defining an axial direction, and a second winding arranged around the axis, wherein the second winding comprises a litz wire having an end portion located at an axial end position of the second winding and a middle portion located at an axial middle position of the second winding, the litz wire having a first cross section at the end portion and a second cross section at the middle portion, a direction from the axial middle position pointing towards the axial end position defining an axial outward direction, the first cross section and the second cross section each comprising in a quadrant between the axial outward direction and a direction pointing towards the first winding a curvature extending between the axial outward direction and the direction pointing towards the first winding, wherein the curvature of the first cross section is smaller than the curvature of the second cross section, wherein the end portion of the second winding includes a turn of at least 300° around the axis, wherein the litz wire of the second winding comprises a continuously transitioning litz wire such that the end portion and the middle portion are devoid of any joints.

2. A transformer according to claim 1, wherein the first winding is an inner winding and the second winding is an outer winding.

3. A transformer according to claim 1, wherein the first winding extends along a first length in an axial direction and the second winding extends along a second length in the axial direction, wherein the second length is shorter than the first length.

4. A transformer according to claim 1, wherein the first cross section and the second cross section each comprise in a second quadrant between the axial outward direction and a direction pointing away from the first winding a second curvature, the second curvature extending between the axial outward direction and the direction pointing towards the first winding, wherein the second curvature of the first cross section is smaller than the curvature of the second cross section.

5. A transformer according to claim 1, wherein the transformer further comprises a ferromagnetic core, and the first winding is arranged around the ferromagnetic core.

6. A transformer according to claim 1, wherein the second winding is a high voltage winding and the first winding is a low voltage winding.

7. A transformer according to claim 1, wherein the second cross section has an essentially rectangular shape and the first cross section has a partly oval shape and partly essentially rectangular shape, wherein the partly oval shape is at least located in the quadrant between the axial outward direction and the direction pointing towards the first winding.

8. A transformer according to claim 1, wherein the litz wire is a continuous conductor comprising the middle portion and the end portion, and wherein the curvature of the first cross section in the end portion in the quadrant between the axial outward direction and the direction pointing towards the first winding is obtained by press-forming the litz wire.

9. A transformer according to claim 1, wherein the second winding comprises two radial rows of the litz wire or litz wires.

10. A transformer according to claim 1, wherein the transformer further comprises a casting embedding the first winding and the second winding.

11. A transformer according to claim 1, wherein the cross sectional area of the litz wire in the first cross section and the second cross section is essentially equal.

12. A transformer according to claim 1, wherein the transformer is a medium frequency transformer, particularly a dry-cast middle frequency transformer.

* * * * *